(12) United States Patent
Kondo et al.

(10) Patent No.: US 11,023,443 B2
(45) Date of Patent: Jun. 1, 2021

(54) COLLABORATIVE PLANNING FOR ACCELERATING ANALYTIC QUERIES

(71) Applicant: Teradata US, Inc., Dayton, OH (US)

(72) Inventors: Derrick Poo-Ray Kondo, Belmont, CA (US); Tongxin Bai, Guangdong (CN); Anjali Betawadkar-Norwood, Campbell, CA (US); Aditi Subodh Pandit, Santa Clara, CA (US); David Everett Simmen, Mountain View, CA (US)

(73) Assignee: Teradata US, Inc., San Diego, CA (US)

( * ) Notice: Subject to any disclaimer, the term of this patent is extended or adjusted under 35 U.S.C. 154(b) by 244 days.

(21) Appl. No.: 15/045,022

(22) Filed: Feb. 16, 2016

(65) Prior Publication Data
US 2016/0239544 A1    Aug. 18, 2016

Related U.S. Application Data

(60) Provisional application No. 62/116,075, filed on Feb. 13, 2015.

(51) Int. Cl.
*G06F 16/22* (2019.01)

(52) U.S. Cl.
CPC ................................ *G06F 16/2291* (2019.01)

(58) Field of Classification Search
CPC ........... G06F 17/30463; G06F 16/2228; G06F 16/2453
See application file for complete search history.

(56) References Cited

U.S. PATENT DOCUMENTS

| | | | | |
|---|---|---|---|---|
| 2007/0022374 A1* | 1/2007 | Huang | ............ | G06F 17/30722 715/205 |
| 2010/0114869 A1* | 5/2010 | Deolalikar | ........ | G06F 16/24524 707/718 |
| 2011/0029508 A1* | 2/2011 | Al-Omari | ......... | G06F 16/24524 707/718 |
| 2011/0066894 A1* | 3/2011 | Berlyant | ............... | G06F 9/5066 714/38.1 |
| 2011/0314000 A1* | 12/2011 | Chaudhuri | ........ | G06F 16/24542 707/718 |
| 2012/0078951 A1* | 3/2012 | Hsu | .................... | G06F 17/30516 707/769 |
| 2014/0032528 A1* | 1/2014 | Mandre | ............. | G06F 17/30463 707/718 |
| 2014/0281303 A1* | 9/2014 | Shau | ................. | G06F 17/30321 711/161 |
| 2015/0074151 A1* | 3/2015 | Chaiken | ............ | G06F 17/30569 707/803 |

(Continued)

*Primary Examiner* — Mohammad S Rostami
(74) *Attorney, Agent, or Firm* — James Stover (57) ABSTRACT

A system and method for determining optimal query plans within distributed database system employing table operators for performing analytic operations for storing and processing multi-structured data. The optimization of a query plan proceeds through a collaborative exchange between a database system optimizer, or planner, and a table operator, wherein multiple communications between said optimizer and said table operator are conducted to exchange input and output information relevant to optimizing execution of the query and table operator.

4 Claims, 5 Drawing Sheets

(56) References Cited

U.S. PATENT DOCUMENTS

2015/0112968 A1* 4/2015 Konik ............... G06F 16/24542
707/718
2015/0149435 A1* 5/2015 McKenna ......... G06F 16/24544
707/714

* cited by examiner

COLLABORATIVE PLANNING FOR ACCELERATING ANALYTIC QUERIES

CROSS REFERENCE TO RELATED APPLICATIONS

This application claims priority under 35 U.S.C. § 119(e) to the following and commonly-assigned patent application, which is incorporated herein by reference:

Provisional Patent Application Ser. No. 62/116,075, entitled "COLLABORATIVE PLANNING FOR ACCELERATING ANALYTIC QUERIES," filed on Feb. 13, 2015, by Derrick Kondo, Tonqxin Bai, Anjali Betawadkar-Norwood, Aditi Pandit, and Dave Simmen.

FIELD OF THE INVENTION

The present invention relates to Big Data analytic platforms, and more particularly, to an improved system and method for optimizing query plans for Big Data systems.

BACKGROUND OF THE INVENTION

The volume, velocity, and variety of Big Data necessitate the development of new, innovative software systems. A multitude of innovative data-processing frameworks have emerged to that end in the last decade. These frameworks can be classified as follows: 1) SQL query engines on modern distributed system frameworks; 2) SQL on shared-nothing architectures, e.g., Teradata Aster Discovery Platform; or 3) Map-Reduce-based procedural functions executing on data in NoSQL key-value stores or distributed file systems. Data scientists often consider SQL too inflexible for applying deep analytics, such as time-series analysis, text analytics, statistics, and machine learning. However, the simplicity of procedural languages and Map-Reduce introduces accidental complexity; application logic often involves development and maintenance of complex code to perform and orchestrate general-purpose, data-processing operations. In addition, for every change in the data model, the code implementing the application logic must be modified.

User-defined table operators, typically written in a procedural language such as Java or C++ embedded in SQL bring together the ability to express complex, custom logic in a procedural language with the simplicity and succinctness of SQL. Table operators evaluate custom user code on an input table and generate an output table to be embedded in a SQL query. Table operators can be easily customized to encapsulate different processing styles such as map, reduce and graph execution. The parallel implementation of table operators in a distributed data and processing system is extremely powerful and allows for iterative discovery of insight into ever-growing data.

A defining feature of the Teradata Aster Discovery platform is its support for parallel execution of table operators across hundreds of servers viewed as a single relational database. Teradata Aster implements its own special table operators, called SQL-analytic functions, which have the following powerful features: 1) A SQL-analytic function is inherently parallelizable across multi-core servers or massively parallel clusters, the SQL-analytic functions encapsulating different programming styles, such as map, reduce, or even graph processing; 2) A SQL-analytic function is self-describing and dynamically polymorphic, its input schema is determined implicitly at query time, and its output schema is determined programmatically by the function itself; and 3) a SQL-analytic function can be composed with other standard SQL operators or a SQL-subquery.

As table operators are executed over large data volumes from diverse data sources, their performance and scalability is critical for operations and revenue generation. Because table operators consume and produce tables, they can be fully composed with traditional relational operators, as well as other table operators. This closure property gives table operators the potential to be optimized using traditional SQL rule-based and/or cost-based optimization techniques. However, the application of those techniques relies on understanding how each query plan operator affects the properties of its input data streams. Every table operator appears as a black box to the database optimizer preventing it from understanding how the table operator modifies the properties of its input data stream. This results in the optimizer generating plans with redundant operations and sub-optimal operator placement. The optimizer is not able to infer even the basic properties of table operators, prohibiting the application of optimization rules and strategies.

This solution described below, referred to as Collaborative Planning, allows an optimizer to remove redundant operations and to re-arrange query plan operators more optimally. The optimization of the query proceeds through a collaborative exchange between the planner and the table operator. Plan properties and context information of the surrounding query plan operations are exchanged between the optimizer and the table operator. Knowing these properties also allows the author of the table operator to optimize its embedded logic.

DETAILED DESCRIPTION OF THE INVENTION

The following detailed description refers to the accompanying drawings. Wherever possible, the same reference numbers are used in the drawings and the following description to refer to the same or similar elements. While embodiments and examples are described, modifications, adaptations, and other implementations are possible. For example, substitutions, additions, or modifications may be made to the elements and stages illustrated in the drawings, and the systems and methods described herein may be modified by substituting, reordering, or adding stages to the disclosed methods or elements to the discloses systems. Accordingly, the following detailed description does not limit the disclosure. Instead, the proper scope of any invention disclosed herein is defined by the appended claims.

Figure 1:
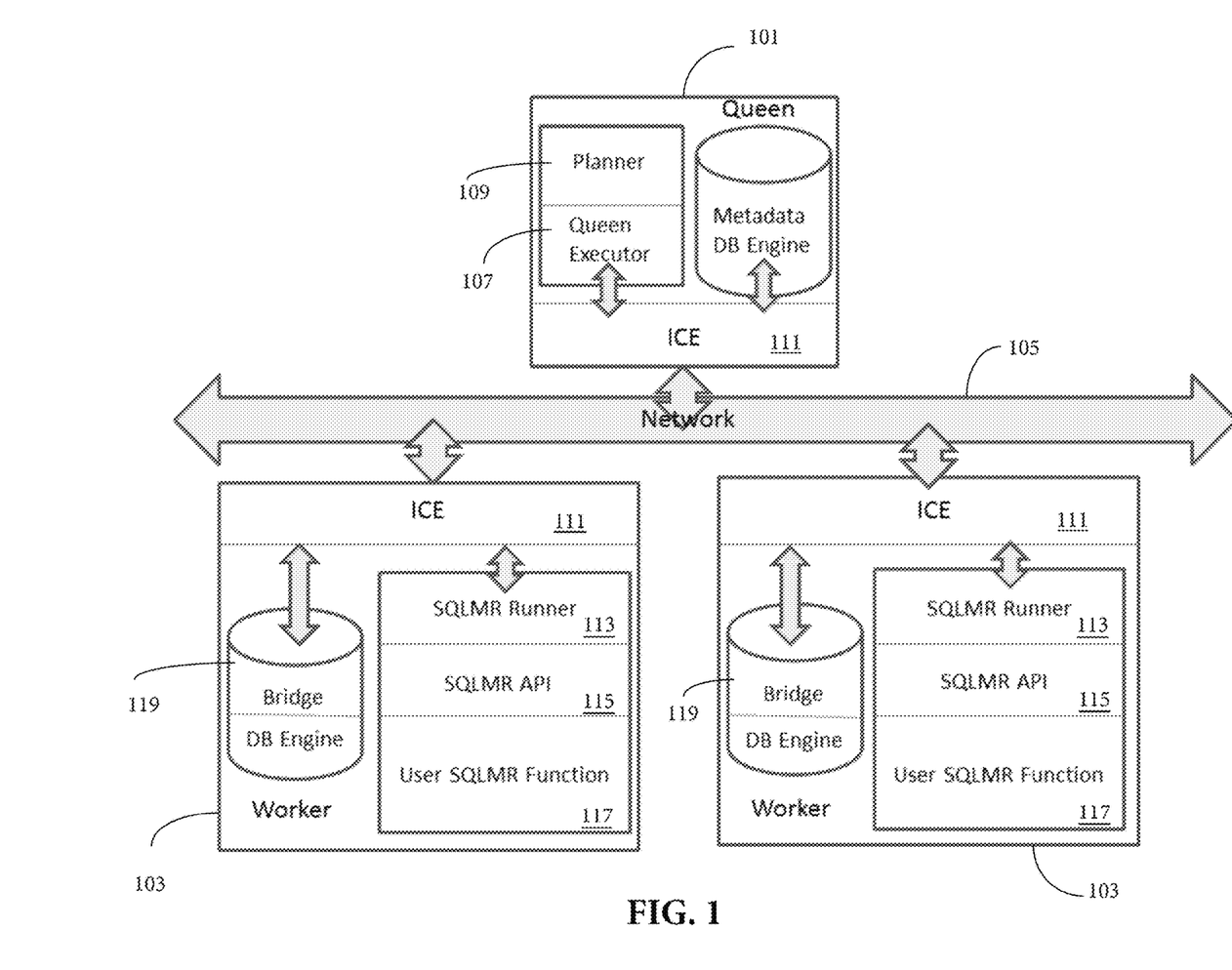
FIG. 1 illustrates an example distributed database system for storing and processing multi-structured data.

FIG. 1 provides an illustration of the Teradata Aster Discovery Platform. The Teradata Aster system comprises of a set of server nodes, 101 and 103, with specific roles, which communicate over a network 105. A Queen node 101 accepts queries on client connections. A Queen Executor process 107 is responsible for query planning, metadata management and co-ordination of the query execution. The Worker nodes 103 are responsible for data storage and local data processing. Relations are hash-partitioned across all nodes or replicated on every Worker node. Each Worker node hosts multiple local database instances (called vWorkers) to process every partition stored. A SqlMRRunner process 113 on the worker node is responsible for the execution of SQL-MR operations. All nodes run an ICE (Inter Cluster Exchange) server process 111 that manages data transfers across nodes.

Queries received by the system are parsed and planned into a sequence of concrete execution phases. A phase is a logical abstraction denoting an execution task that executes concurrently on all the worker nodes, but the phase sequence is coordinated in lock step by the Queen Executor 107. The execution phases are SQL-execution phases, SQL-MR phases or ICE transfer phases. The phase results can be materialized as temporary tables or pipelined through ICE to another location.

Phases use a component called Bridge 119 that manages the communication of data and other messages between the database and the SQL-MR executor process. The Bridge is implemented in the database as a Set Returning Function (SRF). Hence, the SQL-MR phase looks like a SQL command invoking the bridge SRF. In the SQL-MR Executor process, threads for different partitions execute the SQLMRrunner component in parallel. The SQLMRrunner is the counterpart to bridge. It receives data and executes the SQL-MR functions as a process external to the database. Executing the function in a separate process allows the function code to be effectively sand-boxed.

While FIG. 1 shows a single queen node 101, multiple queen nodes can be implemented. Depending on the amount of data to be processed, the system of FIG. 1 can be scaled using additional queen and worker nodes.

Figure 2:
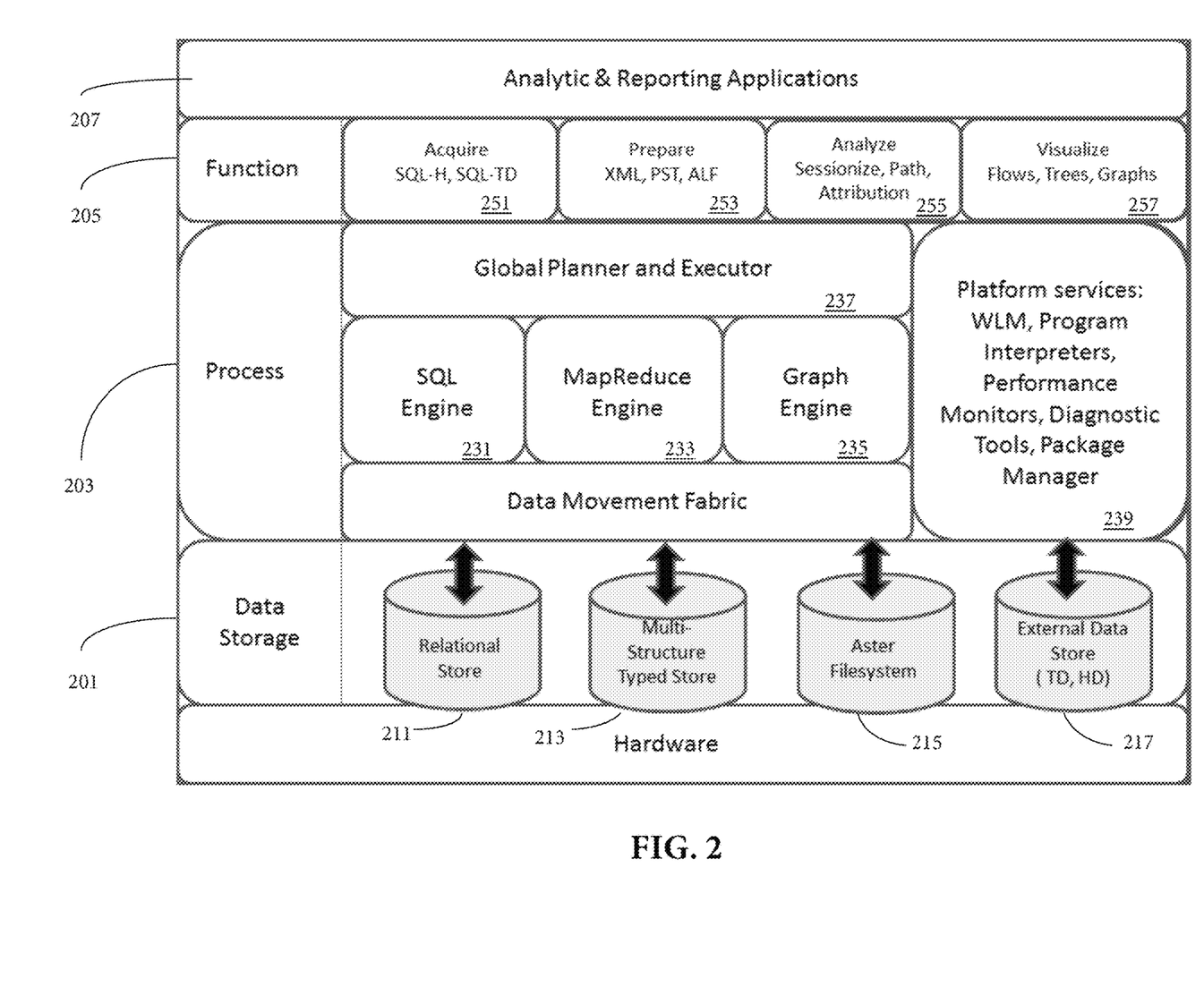
FIG. 2 illustrates the various process and functional layers implemented within the distributed database system of FIG. 1.

The architecture diagram of FIG. 2 shows the various process and functional layers within the Teradata Aster system. The system comprises a storage layer 201, a process layer 203, and a function layer 205. Storage layer 201 supports multiple data stores 211, 213, 215, and 217, such as a relational store 211, and a HDFS-compatible file store called AFS 215. Processing layer 203 consists of various engines for supporting different execution models, such as a SQL Engine 231, a Map-Reduce Engine 233, or a Graph Engine 235. A global planner and executor 237 oversee query execution through these engines, and a set of services 239 manage the platform. Analytic and reporting applications 207 are built over function layer 205 consisting of a pre-built library of analytic, data preparation and visualization functions 251, 253, 257, and 259. Examples of functions include click-stream sessionization, path analysis, attribution analysis, nearest-neighbor classifications, machine learning, data extraction from Hadoop, and graphViz functions. In addition, a SDK including API's and an Eclipse plugin for facilitating implementation and testing of these functions is provided.

SQL-analytic functions can encapsulate different processing styles such as map-reduce and graph. A graph table operator interprets its input tables as a set of vertices and edges. A map-reduce table operator implements a map (ROW-based) or reduce (PARTITION-based) function. The abbreviation SQL-MR is used to denote these map-reduce table operators.

The system, as illustrated in FIGS. 1 and 2, employs an optimizer or planner (FIG. 1, Planner 109; FIG. 2 Global Planner and Executor 237) for evaluating a query and choosing an optimal plan for query execution. The optimizer algorithm is written as a rule engine, applying top-down or bottom-up transformations to the query plans. Some heuristic rules like column projection and limit pushdown are implemented in a top-down traversal. Rules related to the planning of SQL-MR operators or join operators work in a bottom-up traversal and consider several options depending on the columns to be co-located. The rules are applied until a fix-point, after which they cause no further plan changes. Cost-based pruning is applied to keep the most optimal plan for every Interesting Distribution. After all the rules complete, the optimal plan at the root operator of the query is chosen as the final plan.

The Teradata Aster system allows users to extend its analytical capabilities via its SQL-MR interfaces. These interfaces allow users to create custom table operators that perform an analysis of one or more input tables, producing a new output table. The table operators are invoked in the context of an SQL query allowing their output tables to be further processed by traditional relational operators that filter, project, join, aggregate, remove duplicates, order, etc. A SQL-MR table operator is self-describing and dynamically polymorphic as its output schema is determined programmatically from its input schema at query-time. Once the SQL-MR table operator is implemented using the SQL-MR interfaces, it is automatically parallelizable across multi-cores servers or massively parallel clusters.

Even though the table operator functions execute in parallel, there are some differences between table operators and traditional SQL operators such as group-by and join. The optimizer knows how the traditional operators process the input data and understands how the properties of the data stream are modified by the operators, so the optimizer can modify the query plan to remove redundant operators or re-organize operators for more efficient execution. It can also use the query context to simplify the data processing in individual operators.

The table operators on the other hand are a black box to the optimizer. The optimizer has no visibility as to how they process the input data stream and modify its properties. The optimizer is also unaware of how to use the query context information to simplify the data processing of the table operator and in turn the operators below it in the query plan.

The solution described herein addresses limitations in the current art that hamper the optimization of queries involving table operators and the like.

Figure 3:
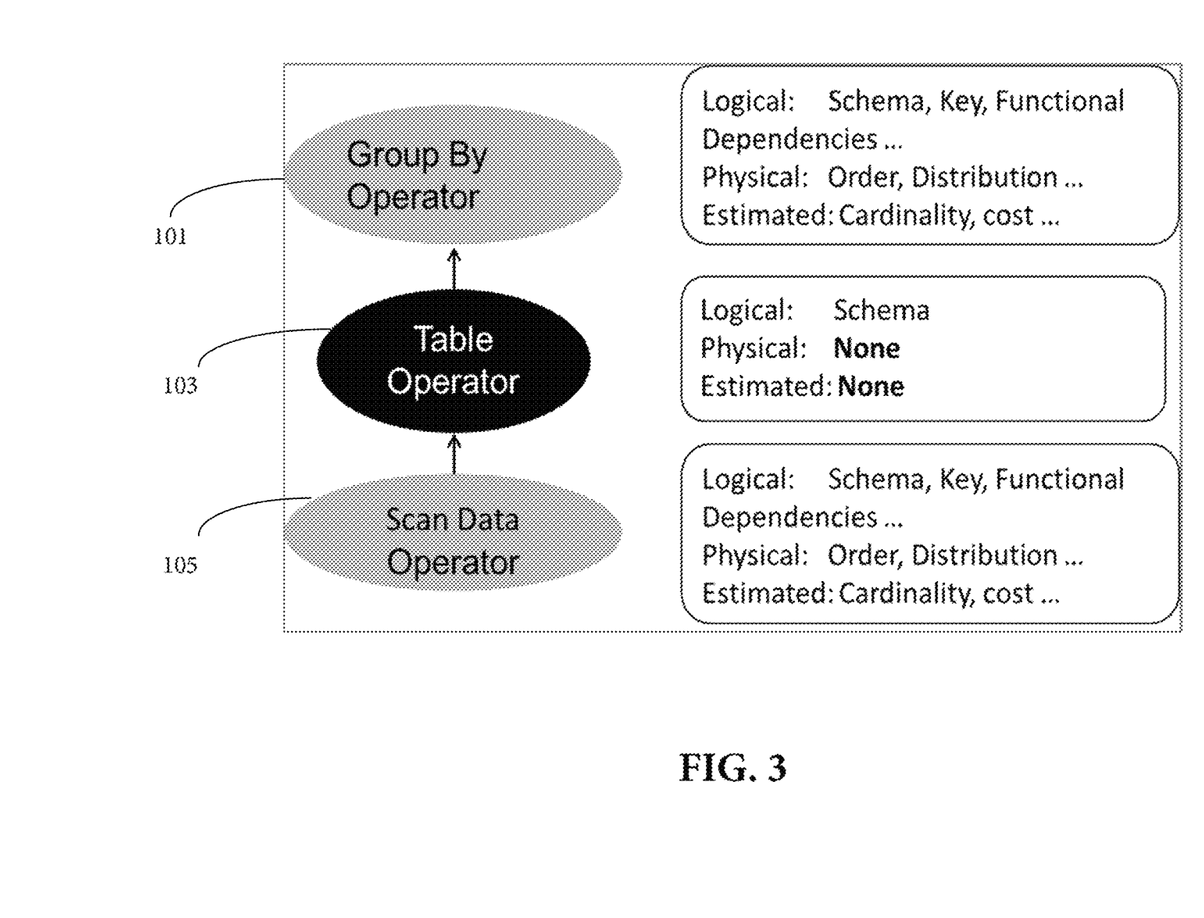
FIG. 3 illustrates the inclusion of table operator properties with the traditional logical and physical operators within the database query optimizer.

The logical and physical expressions in the traditional optimizer search space are extended to include table operator expressions. FIG. 3 shows how the table operator 303 fits in along with the other traditional operators 101 and 105. Prior to Collaborative Planning, the query optimizer knew little about the table operator beyond basic information, such as the names and types of column inputs to the operator, and the names and types of column outputs by the table operator. Collaborative Planning makes these table operator properties available to the cost-based optimizer to choose more optimal plans.

A typical cost-based query optimizer weighs alternative plans to pick the best plan based on some metric, such as estimated resources consumed or estimated execution time. The optimizer has an understanding of properties of the data stream as it is processed by various operators, such as access, join, grouping, and sorting. Each operator in the plan either produces a data stream or affects the properties of the input data stream.

The properties of the data stream can be classified as:

1) Logical properties: Two comparable plan alternatives must have the same logical/relational properties, for example, keys, functional dependencies, and schema.

2) Physical properties: Two comparable plans may have different physical properties, for example, order of data in the stream and distribution of data.

3) Estimated properties, for example, cardinality and cost.

Figure 4:
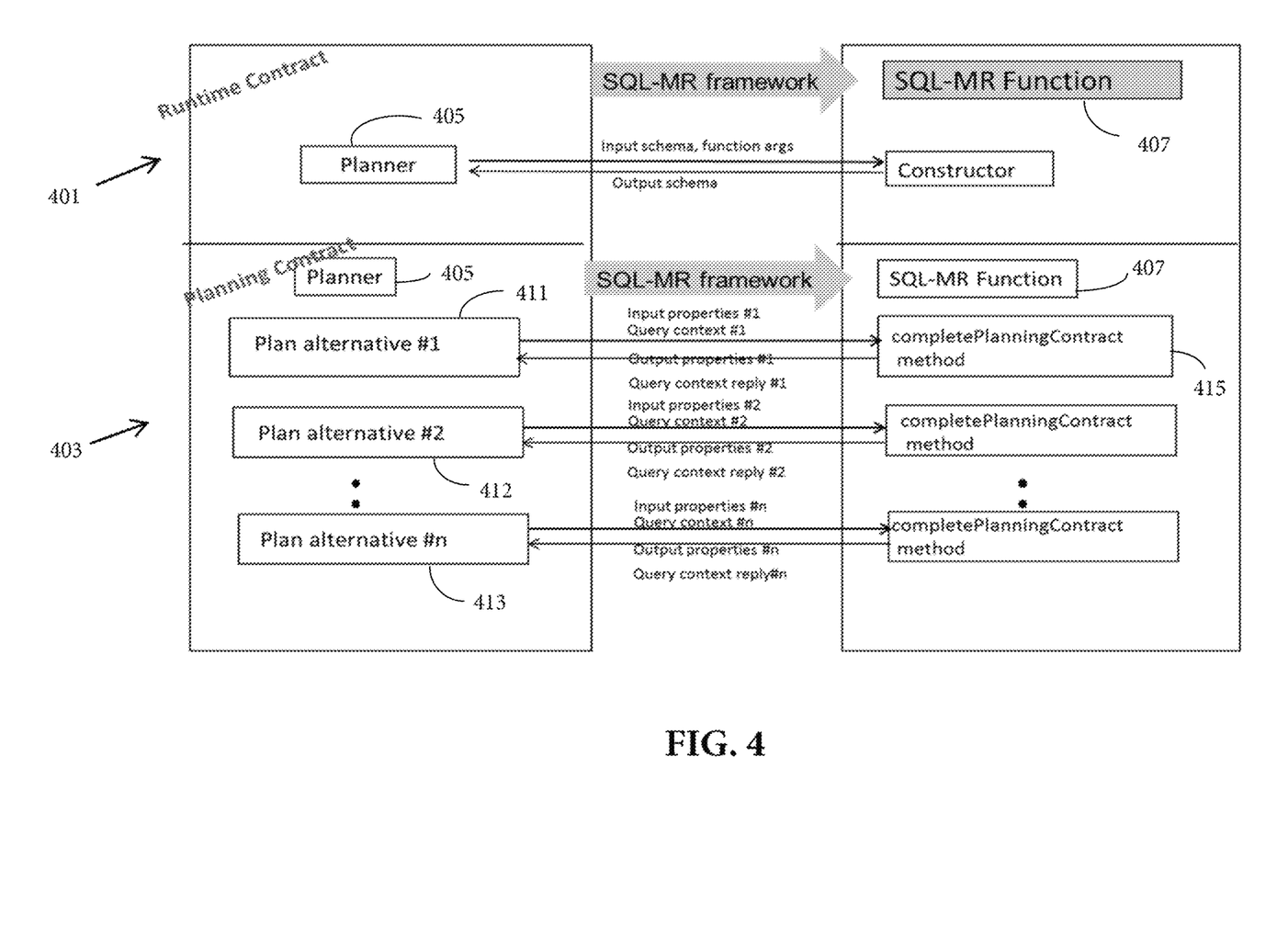
FIG. 4 illustrates the contract negotiation process executed by the query optimizer during query compilation, including a Runtime Contract Negotiation executed once during compilation of a query, and a Planning Contract Negotiation that can be performed multiple times during compilation.

The evaluation of a SQL-MR table operator expression in the optimizer results in a contract negotiation between optimizer and the SQL-MR function instance, wherein input and output information is exchanged. Contract negotiation, as constituted prior to Collaborative Planning, occurs exactly once during query optimization, allowing only the exchange of input and output schema information. The Collaborative Planning process extends contract negotiation so that it can be performed a plurality of times depending on the space of transformations and execution strategies considered by the optimizer, allowing at each negotiation the exchange of additional input and output information relevant to optimizing the overall query and SQL-MR execution. FIG. 4 shows the Runtime Contract Negotiation 401 that happens exactly once between the planner 405 and SQL-MR function 407 during compilation of the query, and the Planning Contract Negotiation 403 that can be performed multiple times.

The Collaborative Planning process extends the plan generation phase of a table operator in a traditional query optimizer whereby alternative execution strategies are generated and evaluated for cost and other properties. The process of generating execution strategies involves consideration of a plurality of logical expression representations of the original query, and a plurality of alternative physical expression representations of the alternative logical expressions. Logical and physical expressions are represented as a directed acyclic graph (DAG) of operators. Each table operator represents an operation that consumes one or more tables, and produces a table. Each operator is evaluated in the context of the expression it is part of in order to determine the logical, physical, and estimated properties of the output table produced by the operator. The properties of the output are typically a function of the properties of the input operators, and the arguments to the operator. A SQL-MR table operator can play the role of either a logical or physical operator during plan generation. The process of evaluating the SQL-MR table operator properties involves performing a contract negotiation with the SQL-MR function instance.

The Collaborative Planning process allows the optimizer to exchange plan properties and context information about the surrounding query plan operators with a table operator. As a result, the optimizer can apply its rules and techniques to generate more optimal plans. It also allows the author of the table operator to optimize its embedded logic.

The two novel aspects of the Collaborative Planning process are the following:

1. The Collaborative Planning process determines and defines the plan and query properties to be exchanged between the planner and table operator. The richness of these properties enables several important SQL optimizations. In general, prior work has focused on only a small subset of the optimizations that this solution enables.

2. The process employs an iterative method by which the optimizer conveys plan and query properties to the table operator, and vice versa. The solution described herein comprises an extensible system and method for optimizing queries involving table operators.

A detailed description of the two main aspects of the collaboration planning process follows.

Information for Collaborative Planning with the Table Operator

The table operator and the optimizer collaborate to exchange several pieces of information that can be of use to each other. The information is roughly divided in following groups:

Properties of the data stream: The optimizer provides properties of the data stream input to the table operator. In the case of multi-input functions, the optimizer provides properties of each of the input data streams. The function provides the properties of the output data stream it emits to the optimizer. The properties include but are not limited to distribution, order, keys etc.

Query Context: The optimizer provides the information about the query surrounding the table operator. This information includes but is not limited to the columns used in the query that are produced by the table operator, the predicates in the query that are relevant to the table operator, and the number of output rows that the query needs from the table operator.

The idea of planning a query in collaboration with the table operator is general and not specific to any particular type of information exchange. In other implementations, any other class/type of information that may be needed by any party and is available to the other party can be easily exchanged using this approach.

Mechanism for the Optimizer and Table Operator Collaboration

The solution described herein enhances the cost-based query optimizer in the database system, such as Teradata or IBM's DB2. The Collaborative Planning process can also be applied to a planner/rewriter in a rule-based database system.

Eric Friedman, Peter Pawlowski, and John Cieslewicz. 2009. SQL/MapReduce: a practical approach to self-describing, polymorphic, and parallelizable user-defined functions. *Proc. VLDB Endow.* 2, 2 (August 2009), 1402-1413, describes a way of contract negotiation between the optimizer and the SQL-MR table operator, i.e., a table operator that performs map-reduce style operations). The solution described herein extends this architecture for use in collaborative planning in the Teradata Aster system. Additionally, the solution can use any other form of bi-directional communication between the optimizer and the table operator in other systems for Collaborative Planning.

In the prior art, a preprocessor communicates the schema, e g, names and data types, of the columns in the input data stream to the SQL-MR table operator using a bridge and bridge-runner in a structure termed as a runtime contract. The SQL-MR table operator responds by filling in the output schema in the runtime contract and by completing the contract. This phase is optional within the Collaborative Planning process described herein.

Utilizing Collabroative Planning, the optimizer 405 sends a planning contract 411 to the completePlanningContract method 415 of the table operator. The planning contract contains the information that the optimizer wants to send to the table operator. The table operator in turn fills in the planning contract with the response to the request information the optimizer sent and completes the contract. This process is repeated potentially multiple times since a cost-based optimizer generates plan alternatives that have different physical and estimated properties and the table operator's response to each set of input properties is different.

A caching mechanism may be optionally built into the optimizer so that each of the planning contracts being sent to the table operator is unique. A plan alternative that has the exact same properties as a plan alternative generated before can make use of the cached copy of the response to the planning contract from the table operator.

The cost-based optimizer then makes use of the information provided by the table operator in planning the query and picks the best plan based on estimated costs of alternatives.

Figure 5:
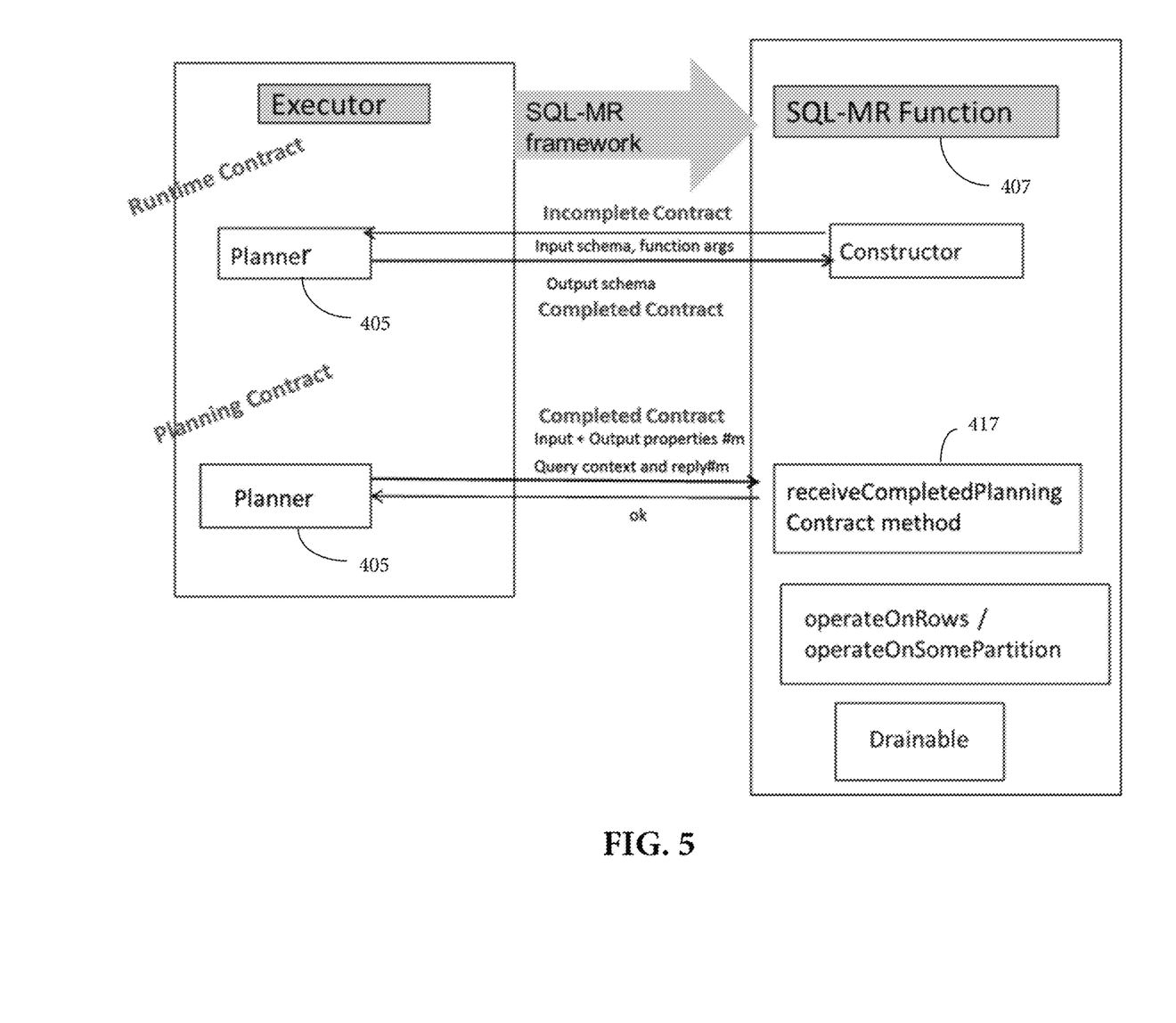
FIG. 5 illustrates the contract negotiation process at execution time.

FIG. 5 illustrates the contract negotiation at execution time. At execution time, the completed planning contract corresponding to the plan chosen by the optimizer is sent to the table operator's receiveCompletedPlanning Contract method 417, and the completed planning contract is then implemented by the table operator in its processing.

The architecture described above can also be used for passing information computed by the table operator at query compilation time to all instances of the table operator on all the local worker computation nodes during execution time. The table operator can cache its function state in the planning contract reply while the query is being compiled. The query compilation is currently done on a randomly chosen worker node. The optimizer caches all the completed planning contracts during compile time. The function state or any other computation can be stored in the planning reply. This computation may or may not be dependent on the information in the planning request. At execution time, the optimizer sends the final planning contract back to the table operator instantiated on each worker node, thus giving all the instances of table operators an access to the function state.

What is claimed is:

1. In a distributed database system employing table operators for performing analytic operations for storing and processing multi-structured data, the method comprising:
   receiving by said database system a query;
   determining through use of a database system optimizer an optimal query plan for execution of said query,
   said optimizer performing a negotiation with a table operator to determine said optimal query plan, wherein said table operator comprises a SQL-Map Reduce function, and said negotiation comprising an exchange of information relevant to optimizing said query and the execution of said SQL-MR function; said exchange of information including a first exchange of input and output schema information, and multiple communications between said optimizer and said table operator to exchange additional input and output information relevant to optimizing execution of said query and table operator; and
   executing said query in accordance with said optimal query plan.

2. The method in accordance with claim 1, wherein:
said multiple communications between said optimizer and said table operator produce multiple query plan alternatives; and
said method further comprises the step of selecting one of said query plan alternatives as said optimal query plan.

3. A database system comprising:
at least one storage device for storing multi-structured data;
a process engine employing table operators for performing analytic operations for storing and processing said multi-structured data;
a database system optimizer for determining an optimal query plan for execution of a query received by said database system,
said optimizer performing a negotiation with a table operator to determine said optimal query plan, wherein said table operator comprises a SQL-Map Reduce function, and said negotiation comprising an exchange of information relevant to optimizing said query and the execution of said SQL-MR function; said exchange of information including a first exchange of input and output schema information; and multiple communications between said optimizer and said table operator to exchange additional input and output information relevant to optimizing execution of said query and table operator; and
executing said query in accordance with said optimal query plan.

4. The method in accordance with claim 3, wherein:
said multiple communications between said optimizer and said table operator produce multiple query plan alternatives; and
said optimizer selects one of said query plan alternatives as said optimal query plan.

* * * * *